Jan. 22, 1963

R. W. STALLINGS 3,074,081

DEVICE FOR INTRODUCING QUEEN BEES

Filed July 5, 1960

INVENTOR
Robert W. Stallings,

*Felix A. Russell*
ATTORNEY.

United States Patent Office 3,074,081
Patented Jan. 22, 1963

3,074,081
DEVICE FOR INTRODUCING QUEEN BEES
Robert W. Stallings, Fairfax, Va., assignor of one-half to Barbara Broadway, Washington, D.C.
Filed July 5, 1960, Ser. No. 40,742
1 Claim. (Cl. 6—9)

The present invention relates to a device for introducing queen bees and it consists in the combinations, constructions and arrangements of parts hereinafter described and claimed.

Generally the invention relates to an inexpensive device for the introduction of queen bees into hives with a minimum loss of egg laying time and without the customary attendant danger of having the queen killed. The device comprises a simple container which consists of a block of wood or the like having a centrally located longitudinal passage therethrough. Enlarged openings extend from one side of the block into communication with the central passageway and a screen cover is provided for these enlarged openings. A perforated foil sheet is pasted or glued to one end of the block and an unperforated foil sheet is likewise affixed to the other end of the block. The openings thus form compartments, preferably and as shown, three in number. One of these compartments is filled with candy and the queen may be shipped while occupying either of the other two compartments. The device is adapted to be placed in a screen enclosure by staples or the like and the enclosure is such that it may be mounted on a comb by pressing the wire cloth sides thereof into the comb for a short distance. A queen excluder is mounted in the enclosure or cage at that end of the block having the candy embedded therein so that bees in the hive may eat their way into physical access to the queen.

It is accordingly an object of the invention to provide a device of the character set forth which is simple in construction, inexpensive to manufacture and yet effective and efficient in use.

Another object of the invention is to provide, in a device of the character set forth, a novel container for a queen bee, such container forming a part of the invention.

Another object of the invention is to provide, in a device of the character set forth, novel ventilating means for a container for a queen bee.

Still another object of the invention is to provide, in a combination, a novel cage and queen bee container, both forming parts of the invention.

Other and further objects of the invention will become apparent from a reading of the following specification taken in conjunction with the drawings, in which.

Figure 1:
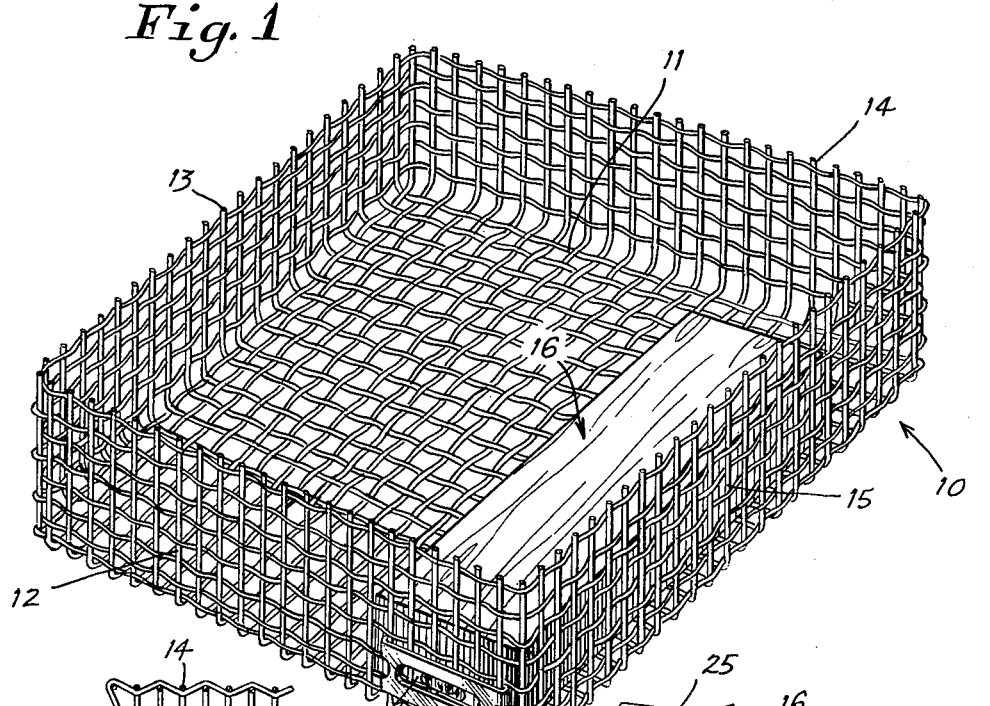
FIGURE 1 is a perspective view of an embodiment of the invention.
Figure 2:
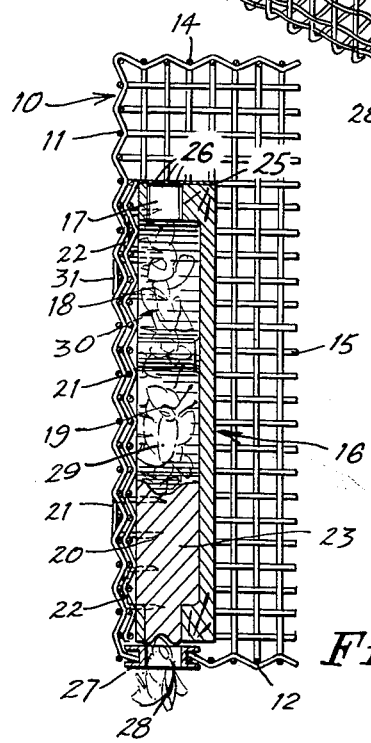
FIGURE 2 is a sectional view of the device illustrated in FIGURE 1.
Figure 3:
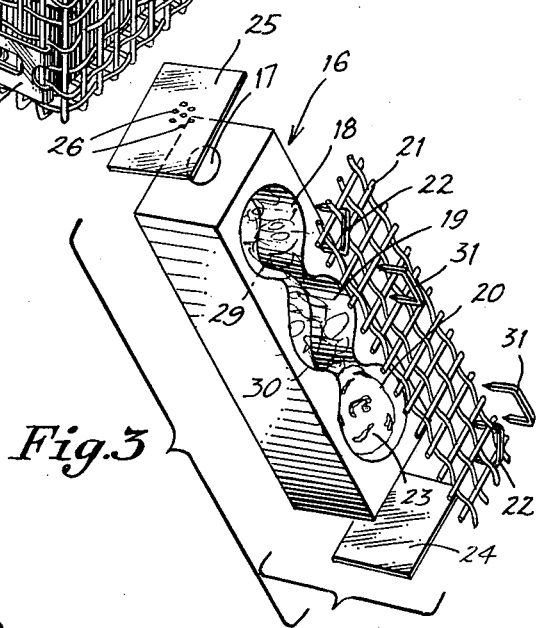

FIGURE 3 is an exploded perspective view of a container forming a part of the invention, Referring more particularly to the drawing, there is shown therein a wire cage generally indicated at 10 and provided with an outer wall 11 and side walls 12, 13, 14 and 15, the outer wall 11 being rectangular and preferably square as shown.

A container is generally indicated at 16 and consists of an elongated block of wood or like material having a centrally disposed longitudinally extending passage 17 therein. Three interconnected openings 18, 19 and 20 extend into one side of the block to communicate with the passage 17. A wire cover 21 is affixed to the block over the openings 18, 19 and 20 by means of staples 22 or the like.

The compartment 20 in the adjacent portion of the passageway 17 is embedded with candy, as indicated at 23 and the adjacent end wall of the block has affixed thereto by pasting, gluing or the like a sheet of foil 24. The other end of the block has likewise affixed thereto a sheet of foil 25 having a series of centrally located perforations 26 formed therein which perforations communicate with the adjacent end of the passage 17.

The side wall 12 of the cage 10 has mounted therein adjacent one end thereof an excluder 27 having the usual opening 28 therein.

In use, a queen bee 29 and a few, usually eight in number worker bees 30 are placed in the compartments 18 and 19 and the cover 21 then fastened thereover by means of the staples 22, the ends of the block having previously been closed by means of the foil sheets 24 and 25. A plurality of the thus assembled blocks containing the bees may then be shipped in side-by-side stacked relationship without smothering the bees therein contained due to the fact that ventilation for the interior of the container 16 is provided by the perforations 26 even though the screen cover 21 may be prevented from allowing air into the interior of the container 16 due to its possible abutting relation to other containers 16.

When the user is ready to re-queen a hive, he should first make certain that the hive is not short of honey and pollen and furthermore that the hive is free of disease. It is then necessary to destroy the old queen and all queen cells in the hive. The foil sheet 24 is then removed from the container 16 and the container is then affixed to the outer wall 11 of the cage 10 with its cover 21 in face-to-face relationship with the wall 11 and with that end thereof containing the candy 23 in abutting relationship with the excluder 27. The container 16 may then be affixed to the wall 11 by means of staples 31. A good brood frame with empty worker cells should then be chosen and the foil sheet 25 may then be removed, the user quickly placing his finger over the opening 17 and the cage 10 and its container 16 may then be attached to the comb by pressing the sharp wire edges of the walls 12, 13, 14 and 15 for a distance into the comb in such manner that the candy containing portion of the container 16 is at the lower end thereof. The frame should then be placed in the center of the brood chamber. This can usually be done by removing one of the outside frames which usually contains no brood. The device should then be left in position without disturbing the same for a period of five days after which the hive may be opened, using as little smoke as possible and any additional queen cells may then be destroyed. The hive may then be closed for an additional twenty-four hour period after which, working quickly but carefully, using as little smoke as possible, the hive may be reopened to remove the cage 10 and its attached container 16 from the brood comb after which the frame may be gently lowered into the brood chamber and the outside frame returned to its original position. After again closing the hive, it should not be disturbed for about a week's time. This method of utilizing the instant device will ensure a complete and proper introduction of a new queen without danger of the queen being killed by "balling" since the bees of the hive must take considerable time to eat their way through the candy 23 in order to reach the queen thus providing time for the odor of the queen to become recognized and sufficiently acquainted with the queen to permit her release without danger of being attacked and killed.

While but one form of the invention has been shown and described herein, it will be readily apparent to those skilled in the art that many minor modifications may be made without departing from the spirit of the invention or the scope of the appended claim.

What is claimed is:

A device of the character described comprising an elongated shipping block having a passageway centrally and longitudinally extending therethrough and candy-filled at one end and having a plurality of interconnected compartments extending laterally from said passageway through one side thereof, an imperforate removable cover sheet affixed to the end of said block, a removable perforated sheet affixed to the other end of said block, a screen cover affixed to the block over said compartments, an open cage having a rectangular outer wall and four side walls, said block being affixed to said outer wall adjacent a corner thereof and with its cover in abutting relation thereto, and means in one of said side walls for access by bees to said block, said means comprising a queen excluder opening in said one of said side walls, said block having the candy-filled end of its passageway immediately adjacent said excluder opening, the rim of said cage being adapted for penetrating anchorage to a honeycomb surface, and said cage covering an area of said honeycomb surface several times the area covered by said block whereby a queen bee, while protected by said cage, can lay her eggs normally in a circular pattern on the cage-covered surface of said honeycomb.

References Cited in the file of this patent
UNITED STATES PATENTS

| | | |
|---|---|---|
| 1,479,751 | Smith et al. | Jan. 1, 1924 |
| 1,482,468 | Hershiser | Feb. 5, 1924 |
| 1,727,078 | Pinard | Sept. 3, 1929 |